United States Patent [19]
Weber et al.

[11] Patent Number: 5,555,246
[45] Date of Patent: Sep. 10, 1996

[54] PROCESS FOR THE PRODUCTION OF A BALANCED WIRE RESISTOR

[75] Inventors: David Weber, Affoltern; Willi Wild, Allenwinden, both of Switzerland

[73] Assignee: Landis & Gyr Business Support AG, Zug, Switzerland

[21] Appl. No.: 193,940

[22] Filed: Feb. 9, 1994

[30] Foreign Application Priority Data

Feb. 16, 1993 [CH] Switzerland ................. 469/93

[51] Int. Cl.⁶ ............... H01C 7/22; H01C 3/16; H01C 3/04; G01K 7/16
[52] U.S. Cl. ............ 338/17; 338/22 R; 338/25; 374/185; 29/612; 29/618
[58] Field of Search ............... 338/314, 25, 17, 338/22 R; 374/185; 29/612, 618

[56] References Cited

U.S. PATENT DOCUMENTS

| | | | |
|---|---|---|---|
| 3,830,105 | 8/1974 | Norsch | 374/185 |
| 4,464,646 | 8/1984 | Burger et al. | 338/314 |
| 4,840,494 | 6/1989 | Horn | 338/195 |

FOREIGN PATENT DOCUMENTS

| | | |
|---|---|---|
| 0150784 | 9/1985 | European Pat. Off. . |
| 2233689 | 10/1975 | France . |
| 2325166 | 4/1977 | France . |
| 2938962 | 4/1981 | Germany . |
| 3217613 | 11/1983 | Germany . |
| 3026914 | 11/1984 | Germany . |
| 2054276 | 2/1981 | United Kingdom . |

OTHER PUBLICATIONS

Manufacturing Process Control In Trimming Application on Fon–Linear, Randomized, Potential Field Devices, by Aleksander Bilinski, Colloque: Systemes Logiques, Sep. 1969, pp. 253–279.

*Primary Examiner*—Diego F. F. Gutierrez
*Attorney, Agent, or Firm*—Meltzer, Lippe, Goldstein, et al.

[57] ABSTRACT

A balanced wire resistor has two interconnected windings with different temperature coefficients. The electrical resistance of the wire resistor is determined only by the resistance values of the two windings. In a process for the production of the wire resistor, the wire length of a first winding of the newly to be wound wire resistance is calculated by using the measured wire length, as well as measured resistance values of the previously wound wire resistor. The wire length of a second winding of the newly to be wound wire resistance is determined by using the two measured wire lengths of the two windings, as well as measured resistance values of the previously wound wire resistor.

10 Claims, 1 Drawing Sheet

PROCESS FOR THE PRODUCTION OF A BALANCED WIRE RESISTOR

BACKGROUND OF THE INVENTION

The invention is related to an balanced wire resistor for the acquisition of temperature and a process for the production of an balanced wire resistor having a first desired resistance value with a first predetermined temperature and a second desired resistance value with a second predetermined temperature.

A wire resistor of this type is used advantageously in devices for the acquisition of the temperature or the temperature change of a medium. This acquisition occurs via the value of the electrical resistance or the change of the value of the electrical resistance of the wire resistor provided in the medium. The invention is generally applicable to wire resistors.

A wire resistor in which a wound wire is connected in series to a printed layer resistor and which is balanced by changing the sheet resistivity to the required extent in a known manner, e.g. by undoing conductor trains or by additional application of conductive layers, is disclosed by DE 32 17 613 A1.

It is also known from DE 29 38 962 A1 that the cross-section of a wound wire resistor can be reduced by sand blasting, thus balancing the wire resistance. However, this balancing procedures method is only suitable for uninsulated wires with relatively large wire diameters.

In addition, a device with a measuring bridge and an unwinding device for the balancing procedures of a wound, insulated wire resistor is disclosed in DE 30 26 914 C2. A generator is capacitatively coupled to the insulated wire of the wire resistor. The generator and insulated wire represent part of the measuring bridge. The wire is unwound by means of the unwinding device from the wire resistor until the desired value of wound wire resistance has been reached.

High manufacturing costs are involved because of expensive balancing procedures when known wire resistors must have desired characteristic curves.

SUMMARY OF THE INVENTION

It is an object of the instant invention to create a wire resistor for the acquisition of temperature which follows a predetermined characteristic curve of electrical resistance as a function of temperature. Another object of the invention is to indicate a process by which the wire resistor can be produced without balancing procedures process.

The invention accomplishes these objects and others by providing a wire resistor having an electrical resistance with a first desired resistance value ($R_{desired,T1}$) for a first predetermined temperature T1 and a second desired resistance value ($R_{desired,T2}$) for a second predetermined temperature T2. This is achieved with a first winding having a first resistance value connected to a second winding having a second resistance value, each winding having a different temperature coefficient. The total electrical resistance (e.g. $R_{desired,T1}$) of the wire resistor is then determined by the combination of the resistance values of the first and second windings.

The invention provides a process for accomplishing these objectives and for making the inventive resistor. This process involves the following steps: measuring the wire length ($1_{W1,i}$) of a first winding of a previously wound i-th resistor; measuring the resistance values ($R_{W1,T2,i}$ and $R_{W1,T1,i}$) of the first winding of the i-th resistor at temperatures T2 and T1, respectively; measuring the wire length ($1_{W2,i}$) of a second winding of the i-th resistor; measuring the resistance values ($R_{W2,T2,i}$ and $R_{W2,T1,i}$) of the second winding of the i-th resistor; calculating the wire length ($1_{W1,i+1}$) of a first winding of a newly to be wound (i+1)th wire resistor based on the measured wire length ($1_{W1,i}$) and the measured resistance values ($R_{W1,T2,i}$ and $R_{W1,T1,i}$) of the first winding of the previously wound i-th wire resistor; and calculating a wire length ($1_{W2,i+1}$) of a second winding of the newly to be wound (i+1)th wire resistor based on the measured wire lengths ($1_{W1,i}$ and $1_{W2,i}$) of the two windings of the i-th resistor, the calculated length ($1_{W1,i+1}$) of the first winding of the (i+1)th resistor, and the measured resistance values ($R_{W1,T2,i}$; $R_{W1,T1,i}$; $R_{W2,T2,i}$; $R_{W2,T1,i}$) of the two windings of the i-th wire resistor.

BRIEF DESCRIPTION OF THE DRAWINGS

Embodiments of the invention are explained in further detail below with reference to the following drawings.

DESCRIPTION OF THE PREFERRED EMBODIMENT

Figure 1:
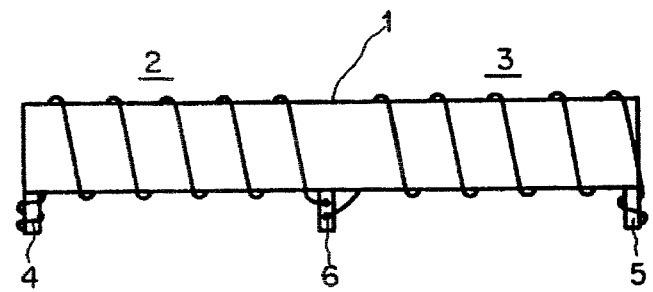
FIG. 1 shows the general structure of a wire resistor according to the invention.

Referring to FIG. 1, the reference 1 designates a winding body of an balanced wire resistor, with a first winding 2 and a second winding 3. The wire resistor is provided with an electric connection element 4 connected to a first end of the first winding 2 and a second electrical connection element 5 connected to a first end of the second winding 3. The second end of the first winding 2 and the second end of the second winding 3 are galvanically connected to each other via an electric connecting element 6. The two windings 2 and 3 are made of wire and have different temperature coefficients.

In principle the wire resistor is balanced either as a series connection of the two windings 2 and 3 or as a parallel connection of the two windings 2 and 3 and can be connected accordingly in a known manner depending on the desired application.

For utilization as a temperature sensor with little expansion, the wire resistor has windings of smaller resulting wire lengths. These windings are balanced as a series connection of the two windings 2 and 3 and can, therefore, be connected to the two connection elements 4 and 5.

When the shortest possible wire lengths are required for a given resistance value $R_{desired,T1}$ or $R_{desired,T2}$ for the two windings 2 and 3, and with a desired wire cross-section, the two windings 2 and 3 are preferably connected in series.

The selected geometric configuration as well as the dimensions of the wire resistor depend essentially on the requirements of the area of application. Thus the winding core 1 may, in a known manner, be tubular or rectangular, rigid or flexible or omitted entirely.

Figure 2:
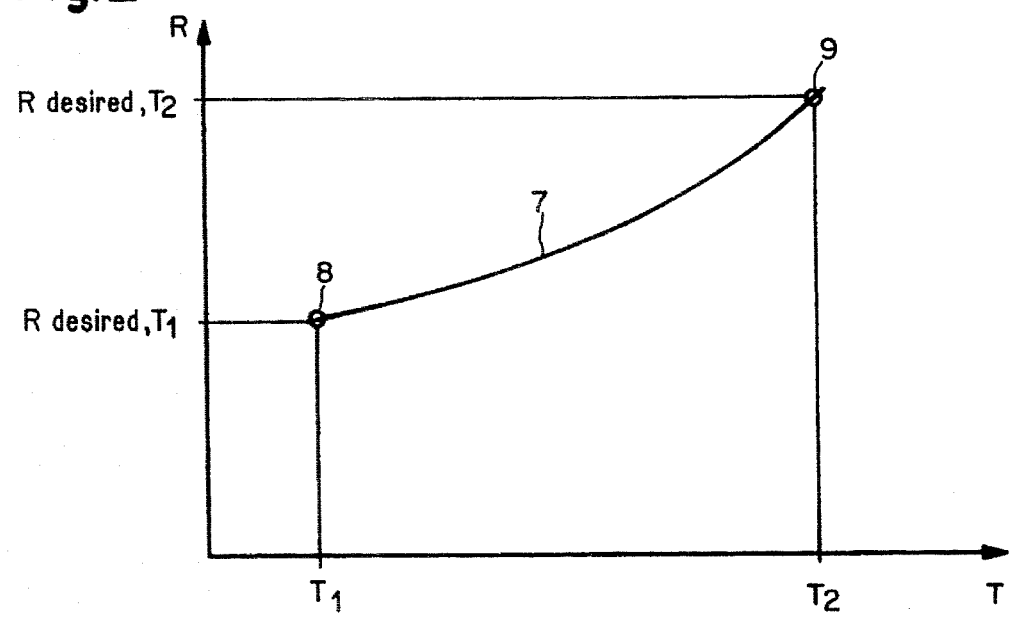
FIG. 2 shows the basic characteristic curve of the wire resistor according to the invention.

In FIG. 2, the characteristic curve 7 of the balanced wire resistor describes the course, in principle, of the resistance value R as a function of temperature T. The wire resistor has a first desired resistance value $R_{desired,T1}$ for a first point 8 on the characteristic curve 7, selected at a lower reference temperature T1, and a second desired value $R_{desired,T2}$ for a point 9 of the characteristic curve 7 selected at a higher reference temperature T2. The characteristic curve 7 of the balanced wire resistor is determined by the two interconnected windings 2 and 3.

An advantageous embodiment of the process for the production of a balanced wire resistor according to the present invention is described below. The computation formulas given apply if the two windings 2 and 3 are connected in series. Corresponding formulas can be derived from these formulas for a wire resistor having the two windings 2 and 3 connected in parallel.

The first winding is wound with a required resistance variation. The resistance variation should occur in the wire resistor at a temperature change in the range between the lower reference temperature T1 and the upper reference temperature T2. The resistance changes or variation are defined and indicated as the difference, $R_{desired,T2} - R_{desired,T1}$, between the second desired value $R_{desired,T2}$ and the first desired value $R_{desired,T1}$.

Hereinafter i indicates a natural number which is used for the continuous counting and designation of wire resistors wound in sequence or of the two windings 2 and 3 associated with each wire resistor.

The wire length $1_{W1,i+1}$ of the first winding 2 of a (i+1)th wire resistor to be newly wound is determined through measurements of the resistance and the wire length of the first winding of the previously wound i-th wire resistor. If the first winding 2 of the i-th wire resistance has a wire length $1_{W1,i}$ while its resistor has a measured value $R_{W1,T1,i}$ at the lower reference temperature T1, and a measured value $R_{W1,T2,i}$ at the upper reference temperature T2, the wire length $1_{W1,i+1}$ of the first winding 2 for the (i+1)th resistor is calculated according to the following formula (F1):

$$1_{W1+1} = [(R_{desired,T2} - R_{desired,T1})/(R_{W1,T2,i} - R_{W1,T1,i})] * 1_{W1,i} \quad (F1)$$

For an advantageous embodiment of the present invention the first winding 2 is made of a metal with high temperature coefficients, preferably nickel.

To ensure that not only the required resistance variation, $R_{desired,T2} - R_{desired,T1}$, but also the two desired values, $R_{desired,T1}$ and $R_{desired,T2}$, which are present in the wire resistor, are adjusted, the first winding 2 is connected to a second winding 3. The second winding is preferably a resistor wire having a temperature coefficient many times smaller than the temperature coefficient of the first winding 2. Therefore, the temperature characteristic of the second winding becomes negligible, and its measured resistance value is represented by $R_{W2,i}$, which is equal to either $R_{W2,T2,i}$ or $R_{W2,T1,i}$.

The wire length $1_{W2,i+1}$ m of the second winding 3 of the newly to be wound (i+1)th wire resistor is determined on the basis of measurements of the resistance $R_{W2,i}$ and the wire length $1_{W2,i}$ of the previously wound second winding 3 of the i-th wire resistor. That is, if the second winding 3 of the i-th wire resistor has a wire length $1_{W2,i}$ and a resistance $R_{W2,i}$ at both the lower reference temperature T1 and the upper reference temperature $T_2$, the wire length $1_{W2,i+1}$ is calculated according to the following formula (F2) pertaining to the lower reference temperature:

$$1_{W2,i+1} = [(R_{desired,T1} - R_{W1,T1,i} * 1_{W1,i+1}/1_{W1,i+1})/R_{W2,i}] * 1_{W2,i} \quad (F2)$$

or else according to the following formula (F3) pertaining to the upper reference temperature:

$$1_{W2,i+1} = [(R_{desired,T2} - R_{W1,T2,i} * 1_{W1,i+1}/1_{W1,i})/R_{W2,i}] * 1_{W2,1} \quad (F3)$$

An advantageous embodiment of the wire resistor where the temperature coefficient of the second winding 3 is negligible, is obtained when the first winding 2 is made of nickel and the second winding 3 is made of a nickel-chrome alloy with a nickel share of 80%, for example.

In a general embodiment of the wire resistor, neither the temperature coefficient of the first winding 2 nor the temperature coefficient of the second winding 3 is negligible. A low-cost embodiment of a wire resistor in which the temperature coefficient of the second winding 3 is not negligible, can comprise the first winding 2 made of nickel and the second winding 3 made of a copper-nickel alloy.

In the general embodiment, the electric resistance of the second winding 3, therefore, has a value $R_{W2,T1,i}$ at the lower reference temperature T1 for the i-th wire resistor and a value of $R_{W2,T1,i+1}$ for the (i+1)th wire resistor. The resistance of the second winding 3 at reference temperature T2 has a value of $R_{W2,T2,i}$ for the i-th wire resistor and a value of $R_{W2,T2,i+1}$ for the (i+1)th wire resistor.

Further, in the general embodiment, the wire lengths $1_{W1,i+1}$ or $1_{W2,i+1}$ of the newly to be wound (i+1)th wire resistor are calculated based on measured values of the previously wound i-th wire resistor.

The wire length $1_{W1,i+1}$ of the first winding of the newly to be wound (i+1)th wire resistor is preferably calculated according to the following formula (F4):

$$1_{W1,i+1} = [(R_{W2,T1,i} * (R_{desired,T2} - R_{desired,T1}) - R_{desired,T1} * (R_{W2,T2,i} - R_{W2,T1,i}))/[R_{W2,T1,i} * (R_{W1,T2,i} - R_{W1,T1,i}) - R_{W1,T1,i} * (R_{W2,T2,i} - R_{W2,T1,i})]] * 1_{W1,i} \quad (F4)$$

While the wire length $1_{W2,i+1}$ is advantageously calculated either according to the following formula (F5) based on the lower reference temperature:

$$1_{W2,i+1} = [(R_{desired,T1} - R_{W1,T1,i} * 1_{W1,i+1}/1_{W1,i})/R_{W2,T1,i}] * 1_{W2,i} \quad (F5)$$

or according to the following formula (F6) based on the upper reference temperature:

$$1_{W2,i+1} = [(R_{desired,T2} - R_{W1,T2,i} * 1_{W1,i+1}/1_{W1,i})/R_{W2,T2,i}] * 1_{W2,i} \quad (F6)$$

In principle, either the first winding 2 or the second winding 3 may be wound first in producing the (i+1)th wire resistor.

Theoretically, the general formula for the first desired value $R_{desired,T1}$ is defined by the following formula (F7):

$$R_{W1,T1,i} * 1_{W1,i}/1_{W1,i} + R_{W2,T1,i} * 1_{W2,i} = R_{desired,T1} \quad (F7)$$

and for the second desired value $R_{desired,T2}$ is defined by the following formula (F8):

$$R_{W1,T2,i} * 1_{W1,i+1}/1_{W1,i} + R_{W2,T2,i} * 1_{W2,i+1}/1_{W2,i} = R_{desired,T2} \quad (F8)$$

From these two formulas (F7) and (F8) a formula (F9) for the calculation of the wire length $1_{W1,i+1}$ of the first winding 2 for the (i+1)th wire resistor can be derived as follows:

$$1_{W1,i+1} = 1_{W1,i} * (R_{W2,T1,i} * R_{desired,T2,i} - R_{W2,T2,i} * R_{desired,T1})/(R_{W2,T1,i} * R_{W1,T2,i} - R_{W1,T2,i} * R_{W1,T1,i}) \quad (F9)$$

and a formula (F10) for the calculation of the wire length $1_{W2,i+1}$ of the second winding 3 for the (i+1)th wire resistor can be derived as follows:

$$1_{W2,i+1} = 1_{W2,i} * (R_{W1,T1,i} * R_{desired,T2} - R_{W1,T2,i} * R_{desired,T1})/(R_{W1,T1,i} * R_{W2,T2,i} - R_{W1,T2,i} * R_{W2,T1,i}) \quad (F10)$$

Figure 3:
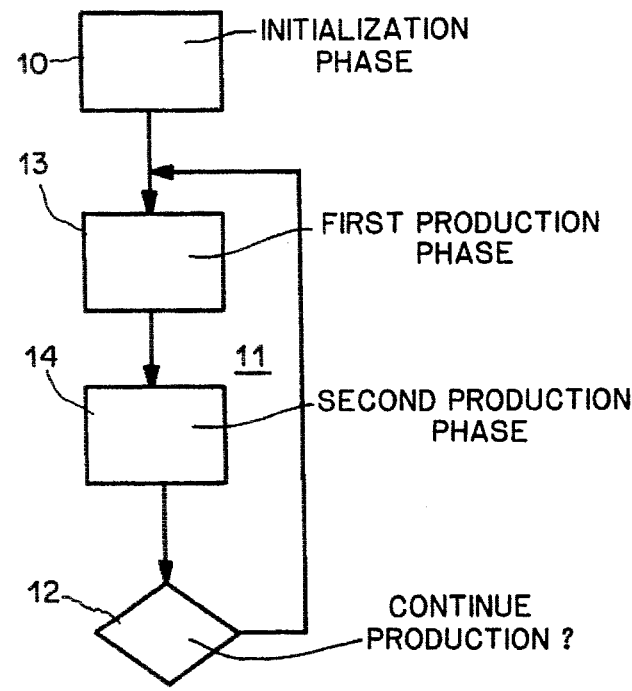
FIG. 3 shows a flow chart for the production of the wire resistor according to the invention.

An advantageous sequence in the production of the wire resistors according to the invention is shown in FIG. 3, in which 10 designates an initialization phase and 11 a loop following the initialization phase 10 and endowed with a loop condition 12. The loop has a first production phase 13 which is followed by a second production phase 14. The initialization phase 10 is accomplished at the beginning of production and, if necessary, also with each new wire roll.

In the initialization phase 10 the number i, signifying the wire resistor to be produced, is set to a starting value, e.g. zero, if required, and the i-th wire resistor is produced. The two wire lengths $1_{W1,i}$ and $1_{W2,i}$ of the first and second windings are determined by a calculation and/or an estimation based, for instance, on the last processed wire roll. The wire resistor produced in the initialization phase may have to be eliminated later on as scrap.

In the first production phase 13 the first winding 2 of the (i+1)th wire resistor is made. The wire length $1_{W1,i+1}$ for this winding is calculated advantageously by using the measured wire length $1_{W1,i}$ and measured resistance value of the i-th wire resistor according to formula (F1) or, for the general embodiment, according to formula (F4) or formula (F9).

In the second production phase 14, the second winding 3 of the (i+1)th wire resistor is produced. The wire length $1_{W2,i+1}$ is advantageously calculated by using the two measured wire lengths $1_{W1,i}$ and $1_{W2,i}$, as well as measured resistance values of the i-th wire resistor according to either of the formulas (F2) or (F3) or, for the general embodiment, according to one of the formulas (F5) or (F6) or (F10), respectively.

At the end of the second production phase 14, the number i is increased by one, and if the loop condition (continue production?) 12 is met, production is continued with the first production phase 13. The loop condition may, for example, check the wire supply.

In the two production phases 13 and 14, the length of the wound resistor wire is measured continuously and precisely during winding. Furthermore, the rise of the resistor wire, i.e., the advance per revolution of the winding body 1, is controlled advantageously on the basis of the length of wire still to be wound up, the position of the thread pipe which guides the resistance wire, and the swing angle position of the winding body 1.

If required, part of the winding 2 or 3 is wound up on the corresponding connection element 4 or 5, whereby the calculated wire lengths $1_{W1,i+1}$ or $1_{W2,i+1}$ can be wound in an optimal manner. The two ends of the windings 2 or 3 are connected advantageously on the connection elements 4 or 5, as well as on the connecting element 6, by means of arc welding.

The wire resistor is balanced upon completion of the winding because the wire resistor has two windings 2 and 3 connected together with different temperature coefficients and at the (i+1)th wire resistor the precise wire length $1_{W2,i+1}$ of the first winding 2 and the precise wire length $1_{W2,i+1}$ of the second winding 3 are calculated by means of measured resistance and length values of the windings of the i-th wire resistor. Possible fluctuations of the temperature coefficients, the specific resistance and the cross-section of the resistor wires used are continuously detected and used for adaptive regulation of the wire length $1_{W1,i+1}$ of the first winding 2 and the wire length $1_{W2,i+1}$ of the second winding 3.

A further simplification of the process, with corresponding savings in time and cost, can be achieved if a process parameter p determined mainly by the wire non-homogeneity of the resistor wire used is introduced, updated and optimized by means of statistic methods when required. Instead of measuring the windings 2 or 3 at every wire resistance, it is simpler to only measure every p-th winding 2 or 3.

The above-described process makes it possible to miniaturize wire resistors, in particular wire resistors used to measure temperature. Since balancing procedures resistances are omitted entirely, the wire resistor can be designed according to the invention for easy application and assembly. In addition, the wire resistor can be produced at low cost.

We claim:

1. A process for the production of a newly to be wound wire resistor having an electrical resistance with a first desired resistance value ($R_{desired, T1}$) at a first predetermined temperature T1 and a second desired resistance value ($R_{desired, T2}$) at a second predetermined temperature T2, said newly to be wound wire resistor comprising a first winding connected to a second winding, said windings having different temperature coefficients and wherein said electrical resistance is determined by said windings, said process comprising measuring a wire length ($1_{w2,i}$) of a wire used for a first winding of a previously wound i-th resistor, measuring a wire length ($1_{w2,i}$) of a wire used for a second winding of said previously wound i-th resistor, measuring a resistance value ($R_{w1,T2,i}$) at said temperature T1 of said first winding of said i-th resistor, measuring a resistance value ($R_{w1,T2,i}$) at said temperature T2 of said first winding of said i-th resistor, measuring a resistance value ($R_{w2,T1,i}$) at said temperature T1 of said second winding of said i-th resistor, measuring a resistance value ($R_{w2,T2,i}$) at said temperature T2 of said second winding of said i-th resistor, calculating a wire length ($1_{w1,i+1}$) for said first winding of a newly to be wound (i+1)th wire resistor based on said desired resistance values ($R_{desired,T2}$ and $R_{desired,T1}$), said measured length ($1_{W1,i}$) and said measured resistance values ($R_{W1,T1,i}$ and $R_{W1,T2,i}$) of said first winding of said previously wound i-th wire resistor, and calculating a wire length ($1_{w2,i+1}$) for said second winding of said newly to be wound (i+1)th wire resistor based on said desired resistance values ($R_{desired,T2}$ and $R_{desired,T1}$), said calculated length ($1_{w1,i+1}$) of said first winding of said (i+1th) resistor, said measured lengths ($1_{W1,i}$ and $1_{W2,i}$) and said measured resistance values ($R_{W1,T1,i}$; $R_{W1,T2,i}$; $R_{W2,T1,i}$; $R_{W2,T2,i}$) of said first and second windings of said previously wound i-th wire resistor.

2. The process according to claim 1, wherein said first winding is made from nickel wire and said second winding is made from chrome-nickel wire.

3. The process according to claim 1 wherein said first winding is made from nickel wire and said second winding is made from a copper-nickel wire.

4. The process according to claim 1 wherein said wire length ($1_{w1,i+1}$) of the wire for said first winding of the newly to be wound (i+1)th wire resistor is calculated according to the following formula:

$$1_{w1,i} = ((R_{desired,T2} - R_{desired,T1})/(R_{W1,T2,i} - R_{W1,T1,i})) * 1_{W1,i}.$$

5. The process according to claim 1 wherein said wire length ($1_{w2,i+1}$) of the wire used for said second winding of the newly to be wound (i+1)th wire resistor is calculated according to the following formula:

$$1_{w2,i+1} = ((R_{desired,T1} - R_{W1,T1,i} * 1_{W1,i+1}/1_{W1,i})/R_{W2,i}) * 1_{W2,i}$$

wherein $R_{W2,i}$ is substantially equal to $R_{W2,T2,i}$ and $R_{W2,T1,i}$.

6. The process according to claim 1, wherein said wire length ($l_{w2,i+1}$) of the second winding of the newly to be wound (i+1)th wire resistor is calculated according to the following formula:

$$l_{w2,i+1}=((R_{desired,T2}-R_{w1,T2,i}*l_{w1,i+1}/l_{w1,i})/R_{w2,i})*l_{w2,i}$$

wherein $R_{w2,i}$ is substantially equal to $R_{w2,T2,i}$ and to $R_{w2,T1,i}$.

7. The process according to claim 1 wherein said wire length ($l_{w1,i+1}$) of the wire for said first winding of the newly to be wound (i+1)th wire resistor is calculated according to the following formula:

$$l_{w1,i+1}=((R_{w2,T1,i}*(R_{desired,T2}-R_{desired,T1})-R_{desired,T1}*(R_{w2,T2,i}-R_{w2,T1,i}))/(R_{w2,T1,i}*(R_{w1,T2,i}-R_{w1,T1,i})-R_{w1,T1,i}*(R_{w2,T2,i}-R_{w2,T1,i}))*l_{w1,i}$$

8. The process according to claim 1 wherein said wire length ($l_{w2,i+1}$) of the wire used for said second winding of the newly to be wound (i+1)th wire resistor is calculated according to the following formula:

$$l_{w2,i+1}=((R_{desired,T1}-R_{w1,T1,i}*l_{w1,i}/l_{w1,i})/R_{w2,T1,i})*l_{w2,i}$$

9. The process according to claim 1, wherein said wire length ($l_{w2,i+1}$) of the second winding of the newly to be wound (i+1)th wire resistor is calculated according to the following formula:

$$l_{w2,i+1}=((R_{desired,T2}-R_{w1,T2,i}*l_{w1,i+1}/l_{w1,i})/R_{w2,T2,i})*l_{w2,i}$$

10. A process for production of a newly to be produced wire resistor having an electric resistance which at a first predetermined temperature (T1) has a first desired resistance value ($R_{desired,T1}$) and at a second predetermined temperature (T2) has a second desired resistance value ($R_{desired,T2}$), comprising selecting two different materials to be wound as resistor wires, each resistor wire having different temperature coefficients, determining a wire length necessary for a first winding required for said newly to be produced wire resistor based on said desired resistance values ($R_{desired,T1}$ and $R_{desired,T2}$), and a measured wire length and measured resistance values at said temperatures T1 and T2 of a first winding of a previously wound identical wire resistor, making said first winding out of one of said two different materials and of a wire length based on said determination, precisely measuring the wire length of said first winding of said newly to be produced wire resistor, determining wire length necessary for a second winding required for said newly to be produced wire resistor based on said desired resistance values ($R_{desired,T1}$ and $R_{desired,T2}$), said measured wire length and said resistance values at T1 and T2 of said first winding of said previously wound wire resistor, a measured wire length and resistance value of a second winding of said previously wound wire resistor, and said precisely measured wire length of said first winding of said newly to be produced wire resistor, making said second winding of said newly to be produced wire resistor out of the other of said two different materials, precisely measuring the wire length of said second winding of said newly to be produced wire resistor, and galvanically connecting at least one end of said first winding of said newly to be produced wire resistor to at least one end of said second winding of said newly to be produced wire resistor so that the connected windings comprise a completed wire resistor.

* * * * *